(12) United States Patent
Batla et al.

(10) Patent No.: US 8,930,048 B1
(45) Date of Patent: *Jan. 6, 2015

(54) ENHANCED COMPOUND STEERING LAW FOR GENERAL LOW THRUST MISSION

(71) Applicant: The Boeing Company, Chicago, IL (US)

(72) Inventors: Fawwad M. Batla, Yorba Linda, CA (US); Yiu-hung M. Ho, Palos Verdes Estates, CA (US)

(73) Assignee: The Boeing Company, Chicago, IL (US)

( * ) Notice: Subject to any disclaimer, the term of this patent is extended or adjusted under 35 U.S.C. 154(b) by 46 days.

This patent is subject to a terminal disclaimer.

(21) Appl. No.: 13/658,634

(22) Filed: Oct. 23, 2012

Related U.S. Application Data

(63) Continuation-in-part of application No. 13/087,280, filed on Apr. 14, 2011, now Pat. No. 8,457,810.

(51) Int. Cl.
  *G05D 3/00* (2006.01)
  *B64G 1/10* (2006.01)
  *B64G 1/24* (2006.01)

(52) U.S. Cl.
  CPC .................................. *B64G 1/242* (2013.01)
  USPC ........................................ 701/13; 244/158.4

(58) Field of Classification Search
  CPC ........ G05D 1/0883; B64G 1/24; B64G 1/242; B64G 1/409; F42B 17/00
  USPC .......... 701/13; 244/3.1, 50, 51, 62, 63, 158.1, 244/158.4, 158.5, 158.6, 171.3; 342/62
  See application file for complete search history.

(56) References Cited

U.S. PATENT DOCUMENTS

| | | | | |
|---|---|---|---|---|
| 5,199,672 A | * | 4/1993 | King et al. | 244/173.3 |
| 5,595,360 A | | 1/1997 | Spitzer | |
| 6,213,432 B1 | * | 4/2001 | Koppel | 244/158.5 |
| 6,341,749 B1 | * | 1/2002 | Ocampo | 244/158.5 |
| 6,937,968 B1 | * | 8/2005 | Carrico et al. | 703/8 |
| 7,918,420 B2 | * | 4/2011 | Ho | 244/169 |
| 8,282,043 B2 | * | 10/2012 | Ho | 244/158.8 |
| 2008/0237399 A1 | * | 10/2008 | Caplin et al. | 244/158.4 |
| 2009/0078829 A1 | * | 3/2009 | Ho et al. | 244/169 |

\* cited by examiner

*Primary Examiner* — Mary Cheung
(74) *Attorney, Agent, or Firm* — Vista IP Law Group LLP; Cynthia A. Dixon

(57) ABSTRACT

The disclosed method involves calculating, with at least one processor, a desired orbit for the spacecraft. The method further involves calculating a velocity change required to achieve an orbit eccentricity, a velocity change required to achieve a semi-major axis, and a velocity change required to achieve an orbit inclination; all of which correspond to the desired orbit for the spacecraft. Also, the method involves calculating the direction of the vector sum of the velocity change required to achieve the orbit eccentricity, the velocity change required to achieve the semi-major axis, and the velocity change required to achieve the orbit inclination. Further, the method involves activating at least one propulsion device of the spacecraft in the direction of the vector sum in order to change the current orbit of the spacecraft to the desired orbit for the spacecraft, thereby changing the orbit eccentricity, the semi-major axis, and the orbit inclination simultaneously.

20 Claims, 13 Drawing Sheets

$$\vec{f} = \frac{\Delta \vec{V}_{ecc} + \Delta \vec{V}_{sma}}{|\Delta \vec{V}_{ecc} + \Delta \vec{V}_{sma}|}$$

$\vec{f}' = \vec{f}$
but with the second component of $\vec{f}'$ set to
$f'(2) = x f(2)$
where $$x = \left(1 + w \cos\left(\frac{tru}{2}\right)\right)$$

$$w = \left|\left(\frac{\Delta V_{sma}}{\Delta V_{ecc}}\right)\right|^{1/3}$$

| Case Type | Standard Strategy TOD (day) | Conventional Strategy TOD (day) | Compound Steering TOD (day) | Refined Compound Steering TOD (day) | XIPSTOP TOD (day) | TOD Savings |
|---|---|---|---|---|---|---|
| Baseline Geosynch Eccentric | 110.6 | N/A | N/A | N/A | 108.1 | 2.3% |
| Baseline Subsynch Eccentric | 115.9 | 114.1 | 106.7 | 106.7 | 107.7 | 7.9% |
| Baseline Supersynch Eccentric | 40.7 | 40.9 | 36.4 | 35.3 | 35.2 | 13.3% |
| Validation Subsynch Eccentric 1 | 28.2 | 26.5 | 24.4 | 24.4 | 25.8 | 13.5 |
| Validation Subsynch Eccentric 2 | 33.1 | 34.7 | 30.4 | 30.4 | 29.3 | 8.2% |
| Validation Subsynch Eccentric 3 | 29.9 | 35.7 | 29.3 | 29.2 | 28.8 | 2.3% |
| Validation Supersynch Eccentric 1 | 35.7 | 36.7 | 33.8 | 33.3 | 33.0 | 6.7% |
| Validation Supersynch Eccentric 2 | 24.7 | 29.8 | 24.1 | 23.9 | 23.5 | 3.2% |
| Real World Mission Example | 113.6 | 116.2 | 97.3 | 94.6 | 94.8 | 16.7% |

FIG. 5

$$f = \frac{\Delta t_{sma}}{\Delta t_{eccentricity} + \Delta t_{sma}} = \frac{\alpha}{1+\alpha}$$

$$\vec{F}_{in\text{-}plane} = \frac{(1-f)\hat{u}_{eccentricity} + f\hat{u}_{sma}}{|(1-f)\hat{u}_{eccentricity} + f\hat{u}_{sma}|}$$

where $\alpha = \frac{\Delta t_{sma}}{\Delta t_{eccentricity}}$, $\hat{u}_{eccentricity} = \frac{\vec{\Delta V}_{eccentricity}}{|\vec{\Delta V}_{eccentricity}|}$, $\hat{u}_{sma} = \frac{\vec{\Delta V}_{sma}}{|\vec{\Delta V}_{sma}|}$ and $\vec{F} = \begin{bmatrix} u_V \\ u_U \\ \cos(\beta) \end{bmatrix}$ $$\beta = \tan^{-1}\left\{\frac{\Delta t_{eccentricity}}{\Delta t_{in\text{-}plane}}\right\}$$

where $\Delta t_{in\text{-}plane}$ is computed from $|\vec{\Delta V}_{eccentricity} + \vec{\Delta V}_{sma}|$

*FIG. 9*

$$\alpha_0 = \frac{\Delta t_{sma}}{\Delta t_{eccentricity}} \omega_{sma}$$

$$\alpha = \alpha_0 \left(1 - \omega_{ecc} \cos(\lambda - \lambda_{ecc}) |\cos(\lambda - \lambda_{ecc})|\right) \quad \text{where } 0 \leq \omega_{ecc} \leq 1$$

$\lambda$ = the orbital location (right ascension)

$\lambda_{ecc}$ = optimal location to change the eccentricity vector.

$$f = \begin{cases} \alpha/(1+\alpha), & \text{when } \Delta t_{eccentricity} > 0 \\ 1, & \text{when } \Delta t_{eccentricity} = 0 \end{cases}$$

$$\vec{F}_{in\text{-}plane} = \frac{(1-f)\hat{u}_{eccentricity} + f\hat{u}_{sma}}{|(1-f)\hat{u}_{eccentricity} + f\hat{u}_{sma}|} = \begin{pmatrix} u_V \\ u_U \\ 0 \end{pmatrix}$$

FIG. 10

$$\beta_0 = \omega_\beta \frac{\Delta t_{inclination}}{\Delta t_{in\text{-}plane}}$$

$$\beta = \tan^{-1}\left[\beta_0 \frac{R}{A_{target}} \frac{\cos(\lambda - \lambda_{inc})}{|\cos(\lambda - \lambda_{inc})|} (1 - \omega_{inc} \sin^2(\lambda - \lambda_{inc}))\right]$$

where $0 \leq \omega_{inc} \leq 1$ $\lambda$ = orbital location (right ascension)

$\lambda_{inc}$ = optimal location to change the inclination vector $R$ = distance from center of the Earth $A_{target}$ = target Semi - Major axis.

Again, $\Delta t_{in\text{-}plane}$ is computed from $\left|\vec{\Delta V}_{eccentricity} + \vec{\Delta V}_{sma}\right|$

FIG. 11

$$\vec{F} = \begin{pmatrix} u_V \\ u_U \\ \cos(\beta) \end{pmatrix}$$

FIG. 12

| Case | Separation | | | | | Target | | | | SMA Target / SMA Initial | Dry Mass | Thrust | Isp | Thruster Ontime (days) | | % difference |
|---|---|---|---|---|---|---|---|---|---|---|---|---|---|---|---|---|
| | Mass | Apogee | Perigee | Eccentricity | Inclination | SMA | Eccentricity | Inclination | | | | | | MinHit (baseline) Keplerian | Compound Steering Keplerian | |
| Case 1A-MX | 1350.0 kg | 42164.10 km | 6628.10 km | 0.728313 | 6.00° | 42164.17 km | 0.000000 | 0.00° | 0.579 | 1100.0 kg | 0.245 N | 3467.0 s | 141.1 | 139.1 | 1.45% |
| Case 1A-HX | 1350.0 kg | 42164.10 km | 6628.10 km | 0.728313 | 6.00° | 42164.17 km | 0.000000 | 0.00° | 0.579 | 1100.0 kg | 0.330 N | 3500.0 s | 104.8 | 103.5 | 1.28% |
| Case 1A-MH | 1550.0 kg | 42164.10 km | 6628.10 km | 0.728313 | 6.00° | 42164.17 km | 0.000000 | 0.00° | 0.579 | 1100.0 kg | 0.380 N | 1720.0 s | 101.0 | 99.6 | 1.36% |
| Case 1A-HH | 1550.0 kg | 42164.10 km | 6628.10 km | 0.728313 | 6.00° | 42164.17 km | 0.000000 | 0.00° | 0.579 | 1100.0 kg | 0.560 N | 1815.0 s | 68.8 | 68.0 | 1.22% |
| Case 2A-MX | 1600.0 kg | 42164.10 km | 6628.10 km | 0.728313 | 6.00° | 42164.17 km | 0.000000 | 0.00° | 0.579 | 1350.0 kg | 0.245 N | 3467.0 s | 167.7 | 164.7 | 1.81% |
| Case 2A-HX | 1600.0 kg | 42164.10 km | 6628.10 km | 0.728313 | 6.00° | 42164.17 km | 0.000000 | 0.00° | 0.579 | 1350.0 kg | 0.330 N | 3500.0 s | 124.1 | 122.6 | 1.18% |
| Case 2A-MH | 1800.0 kg | 42164.10 km | 6628.10 km | 0.728313 | 6.00° | 42164.17 km | 0.000000 | 0.00° | 0.579 | 1350.0 kg | 0.380 N | 1720.0 s | 117.3 | 115.5 | 1.57% |
| Case 2A-HH | 1800.0 kg | 42164.10 km | 6628.10 km | 0.728313 | 6.00° | 42164.17 km | 0.000000 | 0.00° | 0.579 | 1350.0 kg | 0.560 N | 1815.0 s | 79.9 | 78.8 | 1.34% |
| Case 3A-MX | 1650.0 kg | 42164.10 km | 6628.10 km | 0.728313 | 6.00° | 42164.17 km | 0.000000 | 0.00° | 0.579 | 1400.0 kg | 0.245 N | 3467.0 s | 172.6 | 170.0 | 1.50% |
| Case 3A-HX | 1650.0 kg | 42164.10 km | 6628.10 km | 0.728313 | 6.00° | 42164.17 km | 0.000000 | 0.00° | 0.579 | 1400.0 kg | 0.330 N | 3500.0 s | 128.1 | 126.3 | 1.39% |
| Case 3A-MH | 1850.0 kg | 42164.10 km | 6628.10 km | 0.728313 | 6.00° | 42164.17 km | 0.000000 | 0.00° | 0.579 | 1400.0 kg | 0.380 N | 1720.0 s | 120.6 | 119.0 | 1.32% |
| Case 3A-HH | 1850.0 kg | 42164.10 km | 6628.10 km | 0.728313 | 6.00° | 42164.17 km | 0.000000 | 0.00° | 0.579 | 1400.0 kg | 0.560 N | 1815.0 s | 82.1 | 81.1 | 1.23% |
| Case 4P-MX | 1410.0 kg | 27378.00 km | 6662.00 km | 0.608578 | 18.00° | 42164.17 km | 0.000000 | 0.00° | 0.404 | 1160.0 kg | 0.245 N | 3467.0 s | 191.9 | 183.5 | 4.35% |
| Case 4P-HX | 1410.0 kg | 27378.00 km | 6662.00 km | 0.608578 | 18.00° | 42164.17 km | 0.000000 | 0.00° | 0.404 | 1160.0 kg | 0.330 N | 3500.0 s | 139.3 | 136.6 | 1.94% |
| Case 4P-MH | 1410.0 kg | 27378.00 km | 6662.00 km | 0.608578 | 18.00° | 42164.17 km | 0.000000 | 0.00° | 0.404 | 1160.0 kg | 0.380 N | 1720.0 s | 116.4 | 113.6 | 2.42% |
| Case 4P-HH | 1410.0 kg | 27378.00 km | 6662.00 km | 0.608578 | 18.00° | 42164.17 km | 0.000000 | 0.00° | 0.404 | 960.0 kg | 0.560 N | 1815.0 s | 78.9 | 77.4 | 1.92% |
| Case 1F-MX | 1350.0 kg | 46378.10 km | 6563.10 km | 0.752061 | 17.00° | 42164.17 km | 0.000000 | 0.00° | 0.628 | 1100.0 kg | 0.245 N | 3467.0 s | 148.2 | 145.2 | 2.03% |
| Case 1F-HX | 1350.0 kg | 46378.10 km | 6563.10 km | 0.752061 | 17.00° | 42164.17 km | 0.000000 | 0.00° | 0.628 | 1100.0 kg | 0.330 N | 3500.0 s | 109.0 | 107.7 | 1.23% |
| Case 1F-MH | 1550.0 kg | 42164.17 km | 6563.10 km | 0.730619 | 19.00° | 42164.17 km | 0.000000 | 0.00° | 0.578 | 1100.0 kg | 0.380 N | 1720.0 s | 109.9 | 108.4 | 1.38% |
| Case 1F-HH | 1550.0 kg | 42164.17 km | 6563.10 km | 0.730619 | 19.00° | 42164.17 km | 0.000000 | 0.00° | 0.578 | 1100.0 kg | 0.560 N | 1815.0 s | 75.1 | 73.7 | 1.85% |
| Case 2F-MX | 1600.0 kg | 42164.17 km | 6563.10 km | 0.730619 | 19.00° | 42164.17 km | 0.000000 | 0.00° | 0.578 | 1350.0 kg | 0.245 N | 3467.0 s | 182.5 | 179.4 | 1.71% |
| Case 2F-HX | 1600.0 kg | 42164.17 km | 6563.10 km | 0.730619 | 19.00° | 42164.17 km | 0.000000 | 0.00° | 0.578 | 1350.0 kg | 0.330 N | 3500.0 s | 135.5 | 133.3 | 1.66% |
| Case 2F-MH | 1800.0 kg | 42164.17 km | 6563.10 km | 0.730619 | 23.00° | 42164.17 km | 0.000000 | 0.00° | 0.578 | 1350.0 kg | 0.380 N | 1720.0 s | 133.8 | 129.9 | 2.88% |
| Case 2F-HH | 1800.0 kg | 42164.17 km | 6563.10 km | 0.730619 | 23.00° | 42164.17 km | 0.000000 | 0.00° | 0.578 | 1350.0 kg | 0.560 N | 1815.0 s | 90.1 | 88.6 | 1.61% |
| Case 3F-MX | 1650.0 kg | 46378.10 km | 6563.10 km | 0.752061 | 21.00° | 42164.17 km | 0.000000 | 0.00° | 0.628 | 1400.0 kg | 0.245 N | 3467.0 s | 188.5 | 182.9 | 2.96% |
| Case 3F-HX | 1650.0 kg | 46378.10 km | 6563.10 km | 0.752061 | 21.00° | 42164.17 km | 0.000000 | 0.00° | 0.628 | 1400.0 kg | 0.330 N | 3500.0 s | 138.1 | 136.5 | 1.36% |

*FIG. 14A*

| | | | | | | | | | | | |
|---|---|---|---|---|---|---|---|---|---|---|---|
| Case 3F-MH | 1850.0 kg | 42164.17 km | 0.730619 | 23.00° | 42164.17 km | 0.000000 | 0.00° | 0.578 | 1400.0 kg | 0.380 N | 1720.0 s | 136.0 | 133.5 | 1.82% |
| Case 3F-HH | 1850.0 kg | 42164.17 km | 0.730619 | 22.00° | 42164.17 km | 0.000000 | 0.00° | 0.578 | 1400.0 kg | 0.560 N | 18,15.0 s | 92.6 | 90.9 | 1.79% |
| GTO_8i | 1600.0 kg | 42163.84 km | 30164.56 km | 0.165900 | 7.00° | 42164.17 km | 0.000000 | 0.00° | 0.858 | 1400.0 kg | 0.330 N | 3500.0 s | 49.0 | 41.5 | 15.30% |
| Case 4F-MX | 1600.0 kg | 66371.80 km | 6563.10 km | 0.820029 | 9.00° | 42164.17 km | 0.000000 | 0.00° | 0.865 | 1400.0 kg | 0.245 N | 3467.0 s | 154.4 | 153.5 | 0.56% |
| Case 4F-HX | 1600.0 kg | 66371.80 km | 6563.10 km | 0.820029 | 9.00° | 42164.17 km | 0.000000 | 0.00° | 0.865 | 1400.0 kg | 0.330 N | 3500.0 s | 114.6 | 114.3 | 0.30% |
| Case 5F-MX | 1600.0 kg | 66371.80 km | 6563.10 km | 0.820029 | 5.00° | 42164.17 km | 0.000000 | 0.00° | 0.865 | 1400.0 kg | 0.245 N | 3467.0 s | 152.3 | 151.7 | 0.42% |
| Case 5F-HX | 1600.0 kg | 66371.80 km | 6563.10 km | 0.820029 | 5.00° | 42164.17 km | 0.000000 | 0.00° | 0.865 | 1400.0 kg | 0.330 N | 3500.0 s | 113.1 | 112.5 | 0.55% |
| Case 6F-MX | 1600.0 kg | 66371.80 km | 6563.10 km | 0.820029 | 15.00° | 42164.17 km | 0.000000 | 0.00° | 0.865 | 1400.0 kg | 0.245 N | 3467.0 s | 159.5 | 158.8 | 0.46% |
| Case 6F-HX | 1600.0 kg | 66371.80 km | 6563.10 km | 0.820029 | 15.00° | 42164.17 km | 0.000000 | 0.00° | 0.865 | 1400.0 kg | 0.330 N | 3500.0 s | 118.3 | 117.8 | 0.44% |
| Case 4A-MX | 1600.0 kg | 76164.00 km | 6628.10 km | 0.839886 | 6.00° | 42164.17 km | 0.000000 | 0.00° | 0.982 | 1400.0 kg | 0.245 N | 3467.0 s | 151.8 | 151.7 | 0.05% |
| Case 4A-HX | 1600.0 kg | 66371.80 km | 6628.10 km | 0.839886 | 6.00° | 42164.17 km | 0.000000 | 0.00° | 0.982 | 1400.0 kg | 0.330 N | 3500.0 s | 112.7 | 112.7 | 0.04% |
| Case 1L-MX | 1600.0 kg | 42164.10 km | 15808.10 km | 0.454632 | 13.00° | 42164.17 km | 0.000000 | 0.00° | 0.687 | 1400.0 kg | 0.245 N | 3467.0 s | 125.8 | 121.3 | 3.60% |
| Case 1L-HX | 1600.0 kg | 42164.10 km | 15808.10 km | 0.454632 | 13.00° | 42164.17 km | 0.000000 | 0.00° | 0.687 | 1400.0 kg | 0.330 N | 3500.0 s | 92.3 | 90.1 | 2.40% |
| Case 1Pn-MX | 1600.0 kg | 66378.10 km | 17875.10 km | 0.575681 | 13.80° | 42164.17 km | 0.000000 | 0.00° | 0.999 | 1400.0 kg | 0.245 N | 3467.0 s | 114.2 | 113.7 | 0.48% |
| Case 1Pn-HX | 1600.0 kg | 66378.10 km | 17875.10 km | 0.575681 | 13.80° | 42164.17 km | 0.000000 | 0.00° | 0.999 | 1400.0 kg | 0.330 N | 3500.0 s | 84.8 | 84.6 | 0.27% |
| Case 2Pn-MX | 1600.0 kg | 42164.10 km | 20858.10 km | 0.338071 | 8.20° | 42164.17 km | 0.000000 | 0.00° | 0.747 | 1400.0 kg | 0.245 N | 3467.0 s | 94.2 | 87.1 | 7.52% |
| Case 2Pn-HX | 1600.0 kg | 42164.10 km | 20858.10 km | 0.338071 | 8.20° | 42164.17 km | 0.000000 | 0.00° | 0.747 | 1400.0 kg | 0.330 N | 3500.0 s | 68.5 | 64.7 | 5.52% |
| Case 3Pn-MX | 1600.0 kg | 42164.10 km | 33958.10 km | 0.107800 | 2.00° | 42164.17 km | 0.000000 | 0.00° | 0.903 | 1400.0 kg | 0.245 N | 3467.0 s | 29.1 | 25.9 | 10.84% |
| Case 3Pn-HX | 1600.0 kg | 42164.10 km | 33958.10 km | 0.107800 | 2.00° | 42164.17 km | 0.000000 | 0.00° | 0.903 | 1400.0 kg | 0.330 N | 3500.0 s | 21.2 | 19.4 | 8.65% |

ENHANCED COMPOUND STEERING LAW FOR GENERAL LOW THRUST MISSION

CROSS REFERENCE TO RELATED APPLICATION

This application is a Continuation-In-Part application of, and claims priority to and the benefit of, U.S. patent application Ser. No. 13/087,280, filed Apr. 14, 2011, entitled "Compound Steering Law for Efficient Low Thrust Transfer Orbit Trajectory", which is hereby incorporated by reference in its entirety.

FIELD

The present disclosure relates to compound steering laws. In particular, it relates to compound steering laws for efficient low thrust transfer orbit transitions, and to enhanced compound steering laws for general low thrust missions.

BACKGROUND

Currently, there are three commonly used steering laws that are used for low-thrust transfer-orbit missions for spacecrafts. These three prior art steering laws are depicted in FIGS. 1A, 1B, and 1C. These three steering methodologies are used to determine the direction of the in-plane component of acceleration to be applied to the spacecraft during a transfer orbit mission. Specifically, FIG. 1A shows the steering law for an acceleration component that is perpendicular to the line of apoapse ($\perp a$; fixed inertial); FIG. 1B shows the steering law for an acceleration component that is perpendicular to the radius vector ($\perp r$); and FIG. 1C shows the steering law for an acceleration component that is along the velocity/anti-velocity vector ($\|v$). The applicability of any of these three steering laws for a transfer orbit mission is a function of the initial orbit of the spacecraft.

Each of these three prior art steering laws is used to achieve a specific orbit objective. In particular, the steering law depicted in FIG. 1A is used for targeting the orbital eccentricity, and the steering laws depicted in FIGS. 1B and 1C are used for targeting the orbital semi-major axis. With a few exceptions, these steering laws and their objectives are exclusive of each other and, thus, there is a conflict between them when it is desirable to achieve targets for the semi-major axis and the orbit eccentricity parameters (as well as the orbit inclination parameter for out-of-plane cases). For this reason, a typical solution and practice is to divide the mission into distinct phases, with each phase employing a different steering law, in order to achieve the respective orbital targets. As such, the total mission duration is the sum of the duration of each phase that is performed for the mission. The total mission duration can be relatively long when the orbital parameters (i.e. the orbit eccentricity, the semi-major axis, and/or the orbit inclination of the initial orbit) are far from their targets. In addition, it should be noted that switching between different steering strategies during the mission requires reconfiguration of the spacecraft's control systems and large changes to the spacecraft's orientation. Thus, frequent switching between steering laws in every orbit or between different phases during transfer orbit poses operational complexities, including a significant amount of down or no-burn time, which renders the existing solution cumbersome.

SUMMARY

The present disclosure relates to a method, system, and apparatus for application of a compound steering law for an efficient low thrust transfer orbit trajectory for a spacecraft. The present disclosure additionally relates to a method, system, and apparatus for application of an enhanced compound steering law for a general low thrust mission. The compound steering law for an efficient low thrust transfer orbit trajectory for a spacecraft is used to compute the thrust vector direction to change the orbit eccentricity and the semi-major axis of the spacecraft simultaneously; while the enhanced compound steering law for a general low thrust mission is used to compute the thrust vector direction to change the orbit eccentricity, the semi-major axis, and the orbit inclination of the spacecraft simultaneously. As such, the compound steering law utilizes two parameters (i.e. the orbit eccentricity and the semi-major axis) to compute the thrust vector direction for the spacecraft, while the enhanced compound steering law adds an additional third parameter of orbit inclination to compute the thrust vector direction for the spacecraft.

In particular, the disclosed method for a compound steering law for efficient low thrust transfer orbit trajectory for a spacecraft involves calculating, with at least one processor, a desired orbit for the spacecraft. The method further involves calculating, with at least one processor, a velocity change required to achieve an orbit eccentricity that corresponds to the desired orbit for the spacecraft. Also, the method involves calculating, with at least one processor, a velocity change required to achieve a semi-major axis that corresponds to the desired orbit for the spacecraft. In addition, the method involves calculating, with at least one processor, the direction of the vector sum of the velocity change required to achieve the orbit eccentricity and the velocity change required to achieve the semi-major axis. Further, the method involves firing at least one thruster of the spacecraft in the direction of the vector sum in order to change the current orbit of the spacecraft to the desired orbit for the spacecraft, thereby changing the orbit eccentricity and the semi-major axis simultaneously.

In at least one embodiment, the spacecraft is a satellite, a pseudo satellite, a rocket, a space vehicle, and/or a space plane. In one or more embodiments, the spacecraft employs a chemical propulsion system (e.g., a liquid propulsion system (LPS), a solid propulsion system, and/or a gaseous propulsion system), and/or an electrical propulsion system (EPS).

In at least one embodiment, the EPS is a xenon-ion propulsion system (XIPS). In some embodiments, the LPS employs a monopropellant and/or a bipropellant.

In one or more embodiments, the method for application of a compound steering law is performed during a transfer orbit mission for the spacecraft. In some embodiments, the transition orbit mission changes from a low Earth orbit (LEO), a medium Earth orbit (MEO), a geosynchronous Earth orbit (GEO), a highly elliptical orbit (HEO), an inter-planetary orbit, or a lunar orbit mission to a target LEO, MEO, GEO, HEO, inter-planetary orbit, or lunar orbit for the spacecraft. In at least one embodiment, the transition orbit mission changes an initial geo-synchronous eccentric orbit of the spacecraft to a target geo-synchronous circular orbit for the spacecraft. In some embodiments, the transition orbit mission changes an initial sub-synchronous eccentric orbit of the spacecraft to a target geo-synchronous circular orbit for the spacecraft. In other embodiments, the transition orbit mission changes an initial super-synchronous eccentric orbit of the spacecraft to a target geo-synchronous circular orbit for the spacecraft.

In at least one embodiment, the disclosed method for application of a compound steering law is performed during an on-station mission for the spacecraft. In some embodiments, the method is performed with a fixed transfer orbit duration (TOD) in order to maximize payload capacity. In one or more embodiments, the method for application of a compound steering law is performed with a variable TOD in order to minimize TOD for a fixed payload capacity.

In one or more embodiments, a method for application of a compound steering law for efficient low thrust transfer orbit trajectory for a spacecraft involves calculating, with at least one processor, a desired orbit for the spacecraft. Also, the method involves calculating, with at least one processor, a velocity change required to achieve an orbit eccentricity that corresponds to the desired orbit for the spacecraft. In addition, the method involves calculating, with at least one processor, a velocity change required to achieve a semi-major axis that corresponds to the desired orbit for the spacecraft. Additionally, the method involves calculating, with at least one processor, the direction of the vector sum of the velocity change required to achieve the orbit eccentricity and the velocity change required to achieve the semi-major axis.

The disclosed method further involves, calculating, with at least one processor, a factor w that is a function of the absolute value of the velocity change required to achieve the semi-major axis divided by the velocity change required to achieve the orbit eccentricity. In addition, the method involves calculating, with at least one processor, a factor x that is a function of the orbit true anomaly angle of the current orbit for the spacecraft. Further, the method involves firing at least one thruster of the spacecraft in the direction of the vector sum times the factor x in order to change the current orbit of the spacecraft to the desired orbit for the spacecraft, thereby changing the orbit eccentricity and the semi-major axis simultaneously.

In one or more embodiments, a system for application of a compound steering law for efficient low thrust transfer orbit trajectory for a spacecraft involves at least one processor and thrusters on the spacecraft. In particular, at least one processor is configured for calculating a desired orbit for the spacecraft. Also, at least one processor is further configured for calculating a velocity change required to achieve an orbit eccentricity that corresponds to the desired orbit for the spacecraft, and a velocity change required to achieve a semi-major axis that corresponds to the desired orbit for the spacecraft. In addition, at least one processor is further configured for calculating the direction of the vector sum of the velocity change required to achieve the orbit eccentricity and the velocity change required to achieve the semi-major axis. Additionally, at least one thruster on the spacecraft is configured for firing in the direction of the vector sum in order to change the current orbit of the spacecraft to the desired orbit for the spacecraft, thereby changing the orbit eccentricity and the semi-major axis simultaneously.

In at least one embodiment, the disclosed method for an enhanced compound steering law for a general low thrust mission for a spacecraft involves calculating, with at least one processor, a desired orbit for the spacecraft. The method further involves calculating, with at least one processor, a velocity change required to achieve an orbit eccentricity that corresponds to the desired orbit for the spacecraft. Also, the method involves calculating, with at least one processor, a velocity change required to achieve a semi-major axis that corresponds to the desired orbit for the spacecraft. Additionally, the method involves calculating, with at least one processor, a velocity change required to achieve an orbit inclination that corresponds to the desired orbit for the spacecraft.

In addition, the method involves calculating, with at least one processor, the direction of the vector sum of the velocity change required to achieve the orbit eccentricity, the velocity change required to achieve the semi-major axis, and the velocity change required to achieve the orbit inclination. Further, the method involves activating at least one propulsion device of the spacecraft in the direction of the vector sum in order to change the current orbit of the spacecraft to the desired orbit for the spacecraft, thereby changing the orbit eccentricity, the semi-major axis, and the orbit inclination simultaneously.

In at least one embodiment, the spacecraft is a satellite, a pseudo satellite, a rocket, a space vehicle, and/or a space plane. In one or more embodiments, at least one propulsion device is an apparatus or system design that will control the desired motion of an object (e.g., the spacecraft) in a space environment. In some embodiments, at least one propulsion device is a chemical propulsion system (e.g., a liquid propulsion system (LPS), a solid propulsion system, and/or a gaseous propulsion system), and/or an electrical propulsion system (EPS). In at least one embodiment, the EPS is a xenon-ion propulsion system (XIPS). In some embodiments, the LPS employs a monopropellant and/or a bipropellant.

In one or more embodiments, the method for an enhanced compound steering law is performed during a transfer orbit mission for the spacecraft. In some embodiments, the transition orbit mission changes from a low Earth orbit (LEO), a medium Earth orbit (MEO), a geosynchronous Earth orbit (GEO), a highly elliptical orbit (HEO), an inter-planetary orbit, or a lunar orbit mission to a target LEO, MEO, GEO, HEO, inter-planetary orbit, or lunar orbit for the spacecraft. In at least one embodiment, the transition orbit mission changes an initial geo-synchronous eccentric (e.g., equatorial or inclined) orbit of the spacecraft to a target (e.g., geo-synchronous circular) orbit for the spacecraft. In some embodiments, the transition orbit mission changes an initial sub-synchronous eccentric (e.g., equatorial or inclined) orbit of the spacecraft to a target (e.g., geo-synchronous circular) orbit for the spacecraft. In other embodiments, the transition orbit mission changes an initial super-synchronous eccentric (e.g., equatorial or inclined) orbit of the spacecraft to a target (e.g., geo-synchronous circular) orbit for the spacecraft.

In at least one embodiment, the disclosed method for an enhanced compound steering law is performed during an on-station mission for the spacecraft. In some embodiments, the method for an enhanced compound steering law is performed with a fixed transfer orbit duration (TOD) in order to maximize payload capacity. In one or more embodiments, the method for an enhanced compound steering law is performed with a variable TOD in order to minimize TOD for a fixed payload capacity.

In one or more embodiments, a method for an enhanced compound steering law for a general low thrust mission for a spacecraft involves calculating, with at least one processor, a desired orbit for the spacecraft. Also, the method involves calculating, with at least one processor, a velocity change required to achieve an orbit eccentricity that corresponds to the desired orbit for the spacecraft. In addition, the method involves calculating, with at least one processor, a velocity change required to achieve a semi-major axis that corresponds to the desired orbit for the spacecraft. Also, the method involves calculating, with at least one processor, a velocity change required to achieve an orbit inclination that corresponds to the desired orbit for the spacecraft. Additionally, the method involves calculating, with at least one processor, the direction of the vector sum of the velocity change required to achieve the orbit eccentricity, the velocity change required to achieve the semi-major axis, and the velocity change required to achieve the orbit inclination. In one or more embodiments, at least one processor uses at least one weighting factor for the calculating of the direction of the vector sum. Further, the method involves activating at least one propulsion device of the spacecraft in the direction of the vector sum in order to change the current orbit of the spacecraft to the desired orbit for the spacecraft, thereby changing the orbit eccentricity, the semi-major axis, and the orbit inclination simultaneously.

In one or more embodiments, a system for an enhanced compound steering law for a general low thrust mission for a spacecraft involves at least one processor and thrusters on the spacecraft. In particular, at least one processor is configured for calculating a desired orbit for the spacecraft. Also, at least one processor is further configured for calculating a velocity change required to achieve an orbit eccentricity that corresponds to the desired orbit for the spacecraft, a velocity change required to achieve a semi-major axis that corresponds to the desired orbit for the spacecraft, and a velocity change required to achieve an orbit inclination that corresponds to the desired orbit for the spacecraft. In addition, at least one processor is further configured for calculating the direction of the vector sum of the velocity change required to achieve the orbit eccentricity, the velocity change required to achieve the semi-major axis, and the velocity change required to achieve the orbit inclination. Additionally, at least one propulsion device on the spacecraft is configured to activate in the direction of the vector sum in order to change the current orbit of the spacecraft to the desired orbit for the spacecraft, thereby changing the orbit eccentricity, the semi-major axis, and the orbit inclination simultaneously.

The features, functions, and advantages can be achieved independently in various embodiments of the present inventions or may be combined in yet other embodiments.

DRAWINGS

These and other features, aspects, and advantages of the present disclosure will become better understood with regard to the following description, appended claims, and accompanying drawings where:

FIG. 5 illustrates a chart containing a comparison of the different transfer orbit durations for various cases using different steering laws, in accordance with at least one embodiment of the present disclosure.

FIG. 9 shows formulas defining the disclosed enhanced compound steering law for general low thrust missions, in accordance with at least one embodiment of the present disclosure.

FIG. 10 shows formulas for the in-plane component of enhanced compound steering with weighting factors, in accordance with at least one embodiment of the present disclosure.

FIG. 11 shows formulas for the out-of-plane component of enhanced compound steering with weighting factors, in accordance with at least one embodiment of the present disclosure.

FIG. 12 shows a formula for the resulting direction for the enhanced compound steering, in accordance with at least one embodiment of the present disclosure.

FIGS. 14A and 14B contain a table showing a comparison of the transfer orbit duration (TOD) of baseline cases utilizing existing steering strategies and the TOD of cases employing the disclosed enhanced compound steering strategy, in accordance with at least one embodiment of the present disclosure.

DESCRIPTION

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Compound Steering Law

Figure 1C:
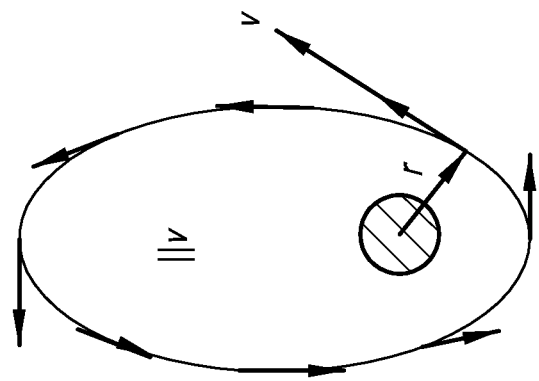
FIG. 1C shows the prior art steering law for an acceleration component that is along the velocity/anti-velocity vector ($\|v$) of the spacecraft's orbit.
Figure 1B:
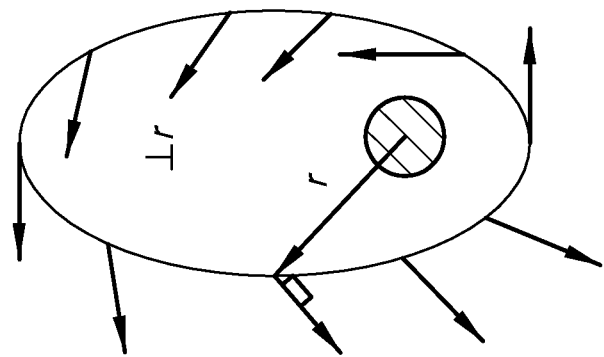
FIG. 1B shows the prior art steering law for an acceleration component that is perpendicular to the radius vector ($\perp$r) of the spacecraft's orbit.
Figure 1A:
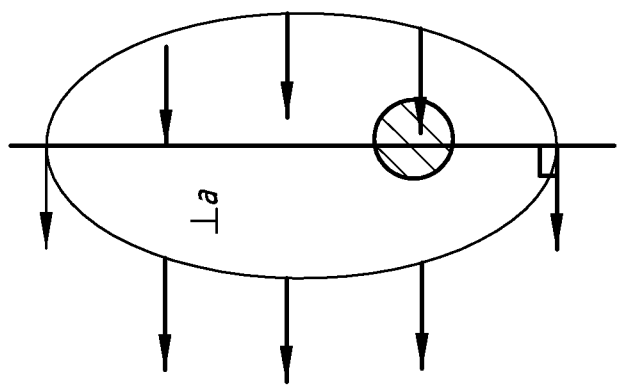
FIG. 1A shows the prior art steering law for an acceleration component that is perpendicular to the line of apoapse ($\perp$a; fixed inertial) of the spacecraft's orbit.

The present disclosure teaches a compound steering law, which combines the individual effects of the steering strategies depicted in FIGS. 1A and 1C. This compound steering law makes it possible to more efficiently accomplish both of the orbital objectives, namely the orbital eccentricity and the semi-major axis targets, simultaneously while allowing for a continuous or near continuous firing of the spacecraft's thrusters and for a smooth transition of the spacecraft's orientation.

The disclosed compound steering law has a number of advantages over the existing prior art steering laws. One advantage is that, while the existing prior art steering strategies impart the required changes to the orbit semi-major axis and eccentricity in a piece-meal fashion, the disclosed compound steering law can accomplish both objectives (i.e. the orbital eccentricity and the semi-major axis targets) efficiently at the same time. Instead of discontinuous segments and abrupt changes in the spacecraft's steering and configuration, the disclosed compound steering law enables continuous firing of the spacecraft's thrusters and a smooth transition of the spacecraft's orientation. Another advantage is that, except for extreme cases when one of the orbital objectives is predominating, the disclosed compound steering law reduces the total transfer orbit mission duration (TOD) as compared to the existing prior art solutions.

Alternatively, for a fixed TOD, the disclosed compound steering law increases the total mass-to-orbit as compared to the prior art existing solutions. Furthermore, the disclosed compound steering law also enables efficient management of environmental effects such as eclipse and atmospheric drag. This is because it minimizes the TOD penalty as a result of eclipses and/or atmospheric drag encountered during transfer orbit since neither balancing coasts nor global re-optimization of the mission is required with the compound steering law, thus providing a more robust and efficient mission. Moreover, in situations where the semi-major axis of an orbit is undesirably affected by an unmodeled force, the disclosed compound steering strategy counters the effect of the force during the course of the transfer orbit with minimal impact to the TOD. Lastly, the disclosed compound steering law enables targeting of longitude in a geo-stationary orbit in addition to the semi-major axis and eccentricity parameters with a single continuous maneuver.

When implemented, the disclosed compound steering law will serve to enhance both the current mass-to-orbit capability and the mission life salvage capability if contingencies arise during the transfer orbit mission. For example, assume a Boeing 702HP satellite standard transfer orbit mission, which includes both a bipropellant transfer orbit mission phase and a low thrust electric propulsion transfer orbit mission phase. In addition, the Boeing 702HP satellite also uses electric propulsion for on-station orbital operations during lifetime. In a first scenario, a pre-EPS phase orbit can be optimized prior to launch when using the disclosed compound steering law. This is because the disclosed compound steering law offers a significant mass-to-orbit advantage over the nominal mass by being able to offload bipropellant rather than having to fill the bipropellant tanks to capacity, as is normally necessary with the use of other prior art steering law(s). The trade would be more mass-to-orbit versus less EPS phase TOD. In a second scenario, if the liquid apogee engine/motor/thruster malfunctions at the end of the apogee burn block, but before starting the perigee maneuvers, during the bipropellant transfer orbit mission phase, the disclosed compound steering law based EPS transfer strategy would minimize the resulting TOD penalty while maximizing the remaining on-station spacecraft life.

As previously mentioned, the existing prior art low thrust transfer orbit strategies are based on a decoupled optimization of the required changes for the orbit semi-major axis and eccentricity (i.e. only one parameter change is optimized at a time, while the other parameter changes as a by-product of the first). As such, multiple spacecraft maneuvers comprised of multiple steering laws are required to achieve the target orbit semi-major axis and eccentricity. However, with the disclosed compound steering law, the $\Delta V$ (i.e. change in velocity) impartation direction can be constantly optimized such that it results in a constant and simultaneous change to both of the orbital parameters (i.e. the orbit semi-major axis and eccentricity) as a function of the transfer orbit duration.

Figures 2, 3, 4:
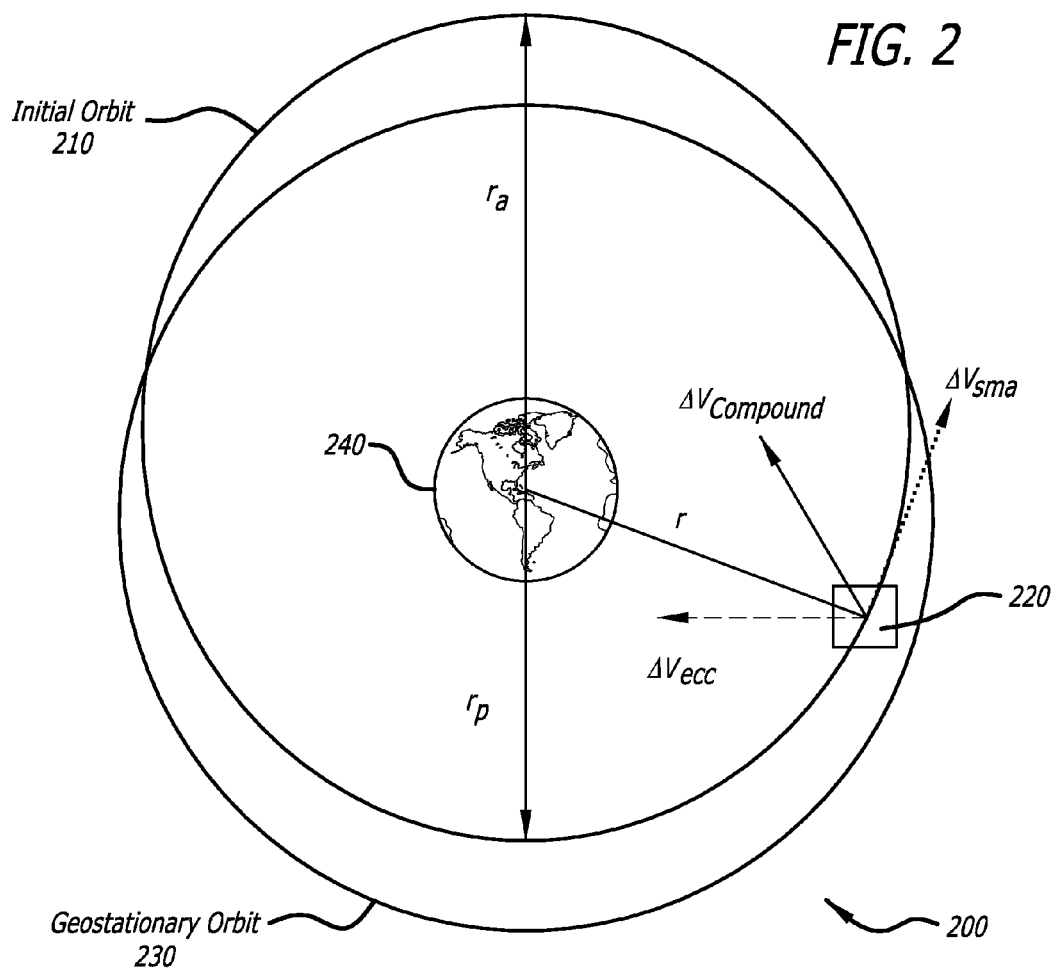
FIG. 2 illustrates a schematic diagram of the disclosed compound steering law being employed to change an initial sub-synchronous eccentric orbit of the spacecraft to a target geo-synchronous circular orbit for the spacecraft, in accordance with at least one embodiment of the present disclosure.
FIG. 3 shows the formula for the disclosed compound steering law for efficient low thrust transfer orbit trajectories, in accordance with at least one embodiment of the present disclosure.
FIG. 4 shows the formula for the disclosed refined compound steering law for efficient low thrust transfer orbit trajectories as well as shows some other related formulas, in accordance with at least one embodiment of the present disclosure.

FIG. 2 illustrates a schematic diagram 200 of the disclosed compound steering law being employed to change an initial sub-synchronous eccentric orbit 210 of the spacecraft 220 to a target geo-synchronous circular orbit 230 for the spacecraft 220, in accordance with at least one embodiment of the present disclosure. In particular, this diagram 200 illustrates the compound steering direction ($\Delta V_{compound}$) that is required for a sub-synchronous eccentric initial orbit 210 with a target geo-stationary orbit 230.

In FIG. 2, the spacecraft 220 is shown to be orbiting the Earth 240 with an initial sub-synchronous eccentric orbit 210. The initial sub-synchronous eccentric orbit 210 has an apogee radius ($r_a$) and a perigee radius ($r_p$). In addition, the spacecraft is shown to have a radius (r) to the Earth 240. The compound steering direction ($\Delta V_{compound}$) is the direction of the vector sum of the change in velocity required to achieve the target semi-major axis ($\Delta V_{sma}$) and the change in velocity required to achieve the target orbit eccentricity ($\Delta V_{ecc}$). The spacecraft's thrusters are fired in the compound steering direction ($\Delta V_{compound}$) in order to change the current orbit 210 of the spacecraft 220 (i.e. the sub-synchronous eccentric initial orbit 210) to the target orbit 230 for the spacecraft 220 (i.e. the target geo-stationary orbit 230).

FIG. 3 shows the formula 300 for the disclosed compound steering law for efficient low thrust transfer orbit trajectories, in accordance with at least one embodiment of the present disclosure. For the formula 300 in this figure, $\vec{f}$ is the direction of the thrust to be applied to the spacecraft at any point in orbit in order to achieve the target orbital parameters (i.e. $\vec{f}$ is the unit vector for the direction of applied dV). Also for this formula 300, $\Delta \vec{V}$ sma is the direction along or opposite to the orbital velocity vector in the non-inertial orbital frame, and $\Delta \vec{V}$ ecc is the direction perpendicular to the line of apses in the inertial frame.

FIG. 4 shows the formula 400 for the disclosed refined compound steering law for efficient low thrust transfer orbit trajectories as well as shows some other related formulas 410, 420, in accordance with at least one embodiment of the present disclosure. Although the compound steering law of FIG. 3 affords considerable TOD savings relative to standard prior art steering laws, the refined compound steering law of FIG. 4 is slightly more efficient than the compound steering law of FIG. 3.

For the formula 400 in this figure, $\vec{f}$ represents the direction of the thrust to be applied to the spacecraft at any point in orbit in order to achieve the target parameters. Formula 400 describes $\vec{f}$. In formula 410, x is a factor to be used by formula 400, w is a factor to be optimized for each unique transfer orbit case, and tru is the orbit true anomaly angle of the spacecraft's initial (i.e. previous) orbit. Alternatively, formula 420 can be used to calculate a value for factor w to be used for formula 410, where $\Delta V_{sma}$ is the change in velocity required to achieve the target semi-major axis and $\Delta V_{ecc}$ is the change in velocity required to achieve the target orbit eccentricity.

FIG. 5 illustrates a chart 500 containing a comparison of the different transfer orbit durations for various cases using different steering laws, in accordance with at least one embodiment of the present disclosure. The Boeing S&IS (Space and Intelligence Systems) Astrodynamics department's analysis and operations tool called XIPSTOP (Xenon Ion Propulsion System Trajectory Optimization Program) was used to simulate the various cases in order to obtain the data presented in the chart 500. XIPSTOP is a flight-proven high-fidelity trajectory optimization tool, and despite its name's suggestion of being limited to XIPS, is a generic optimizer. XIPSTOP is a high-fidelity transfer-orbit trajectory optimization tool which makes use of segments (i.e. the entire transfer orbit mission is divided into multiple segments, and each segment is individually optimized in order to achieve the final target orbit). Each segment is comprised of coast duration, burn duration, firing attitude, thruster pair, and various other constraints related to these and other parameters.

Initially, three transfer orbit missions were simulated. These missions have a geo-synchronous eccentric initial orbit, a sub-synchronous eccentric initial orbit, and a super-synchronous eccentric initial orbit, and all three missions have a target geo-synchronous circular orbit. Then, six more cases were simulated to validate the compound steering law based on the TOD results. The differences found between the TOD results based on the compound steering law and the fully optimized transfer orbit test results from XIPSTOP were in good agreement, and most of the differences were within the numerical error of the computational methods. Furthermore, both the compound steering law and XIPSTOP TOD values were smaller when compared to the standard and conventional strategies. The chart 500 illustrates these results.

For chart 500, the "Standard Strategy" assumes that both the orbit eccentricity and the semi-major axis targets are achieved in distinct phases over the transfer orbit duration in series, and the order of the phases is dependent on the initial orbit. The "Conventional Strategy" implies that both the orbit eccentricity and the semi-major axis targets are achieved in piece-meal fashion by using different steering strategies over each revolution, and repeating this pattern throughout the transfer orbit duration. The "Compound Steering" TOD means that the disclosed compound steering law was used to obtain the numbers. The "Refined Compound Steering" TOD uses the disclosed refined compound steering law, which is essentially the disclosed compound steering law with fine-tuning applied to it. Lastly, the "XIPSTOP" TOD designates the XIPSTOP tool's optimized solution based results. The TOD savings were arrived at by comparing the "Standard" TOD values to the "Refined Compound Steering" TOD values.

Figure 6:
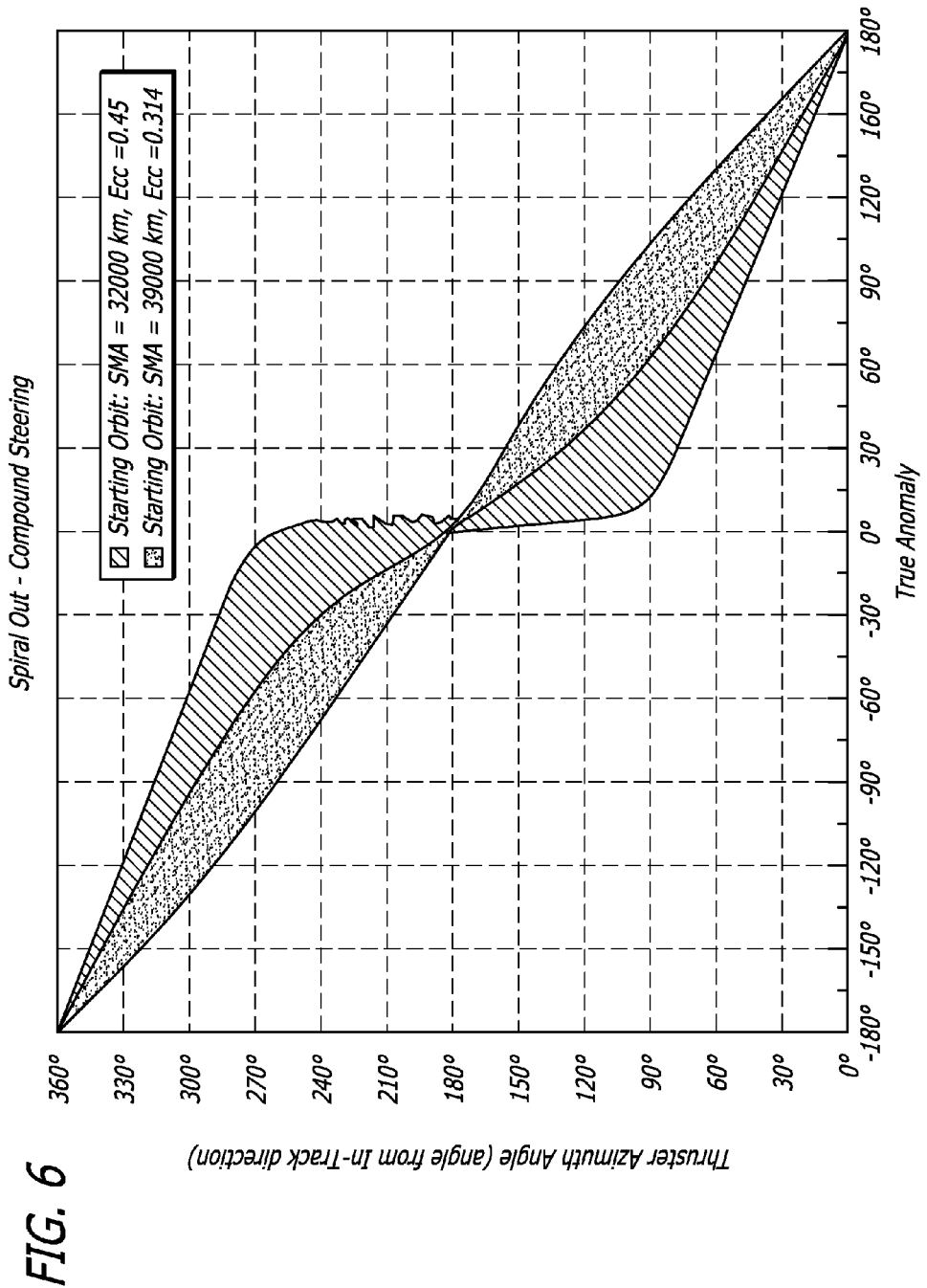
FIG. 6 shows the thruster azimuth angle profile as a function of the orbit true anomaly angle over the entire transfer using the disclosed compound steering law for a sub-synchronous eccentric initial orbit (i.e. spiral out), in accordance with at least one embodiment of the present disclosure.
Figure 7:
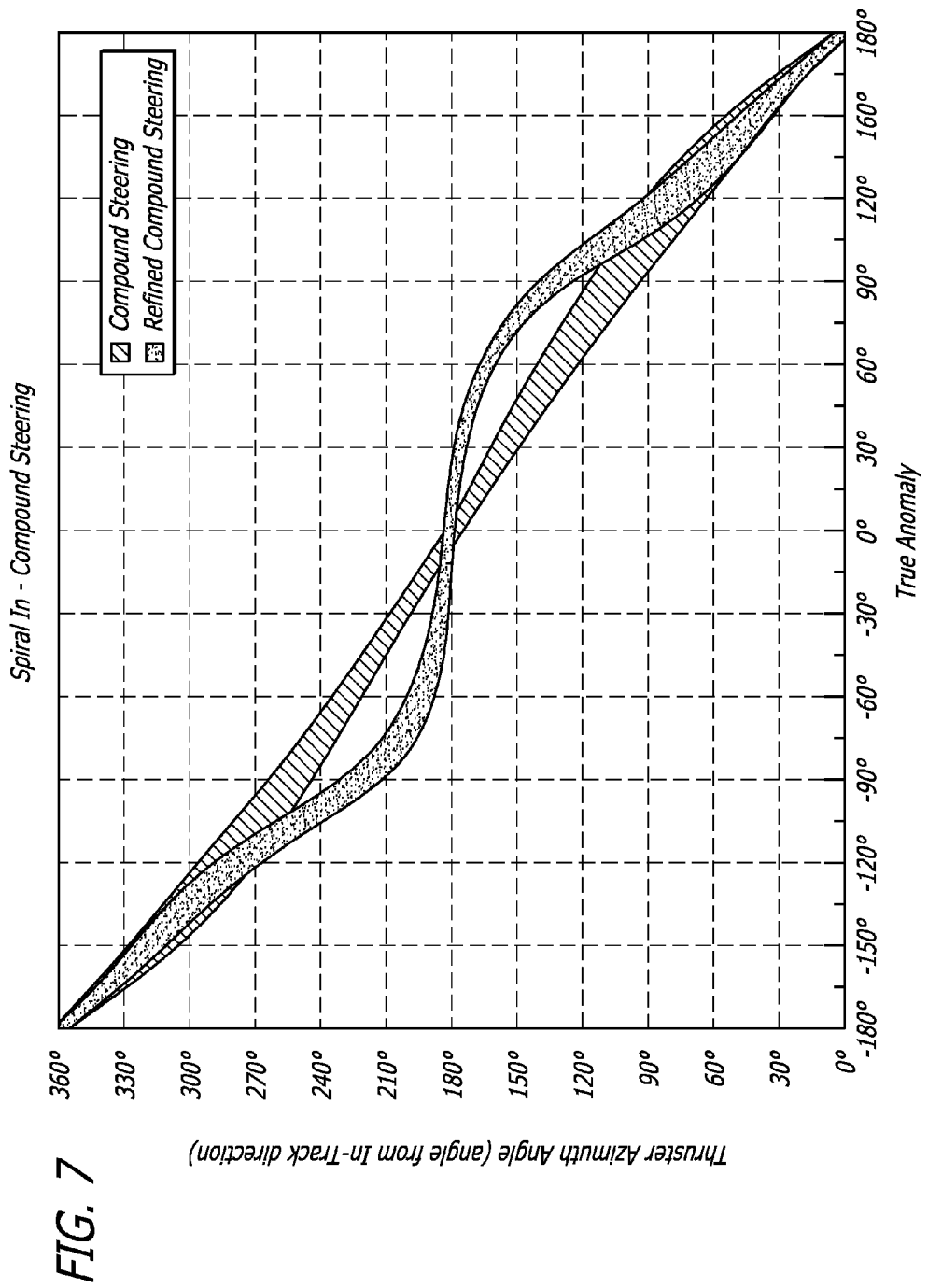
FIG. 7 shows the thruster azimuth angle profile as a function of the orbit true anomaly angle over the entire transfer using the disclosed compound steering law and the disclosed refined compound steering law for a super-synchronous eccentric initial orbit (i.e. spiral in), in accordance with at least one embodiment of the present disclosure.

FIGS. 6 and 7 each show a simulated thruster azimuth angle profile as a function of orbit true anomaly angle over the entire transfer for sub-synchronous (i.e. spiral out) and super-synchronous (i.e. spiral in) eccentric orbit cases. In particular, FIG. 6 shows the thruster azimuth angle profile as a function of the orbit true anomaly angle over the entire transfer using the disclosed compound steering law for a sub-synchronous eccentric initial orbit (i.e. spiral out), and FIG. 7 shows the thruster azimuth angle profile as a function of the orbit true anomaly angle over the entire transfer using the disclosed compound steering law and the disclosed refined compound steering law for a super-synchronous eccentric initial orbit (i.e. spiral in).

It should be noted that in FIGS. 6 and 7, the thrust vector azimuth angle profile for these cases has a noticeably uniform trend across the entire transfer orbit mission. In other words, the thrust vector continuously, uniformly, and smoothly steers over every orbit and throughout the transfer orbit mission. This observed thrust vector steering behavior, which is based on the disclosed compound steering law and refined compound steering law, is the reason for the continuous and simultaneous changes to the orbit eccentricity and semi-major axis parameters throughout the transfer orbit mission. These results are in sharp contrast to standard or conventional strategy based transfer cases, where the azimuth angle has abrupt transitions over an orbit revolution and/or an entire transfer.

For FIGS. 6 and 7, the azimuth angle in this reference frame is defined as the angle between the local orbital velocity vector and the spacecraft thrust vector. Thus, a zero-degree azimuth angle means that the thrust vector is aligned with the local velocity vector and, therefore, the $\Delta V$ imparted to the orbit is posi-grade. A 180° azimuth angle value means that the thrust vector is aligned with the local anti-velocity vector and, therefore, the $\Delta V$ imparted to the orbit is retro-grade.

Figure 8A:
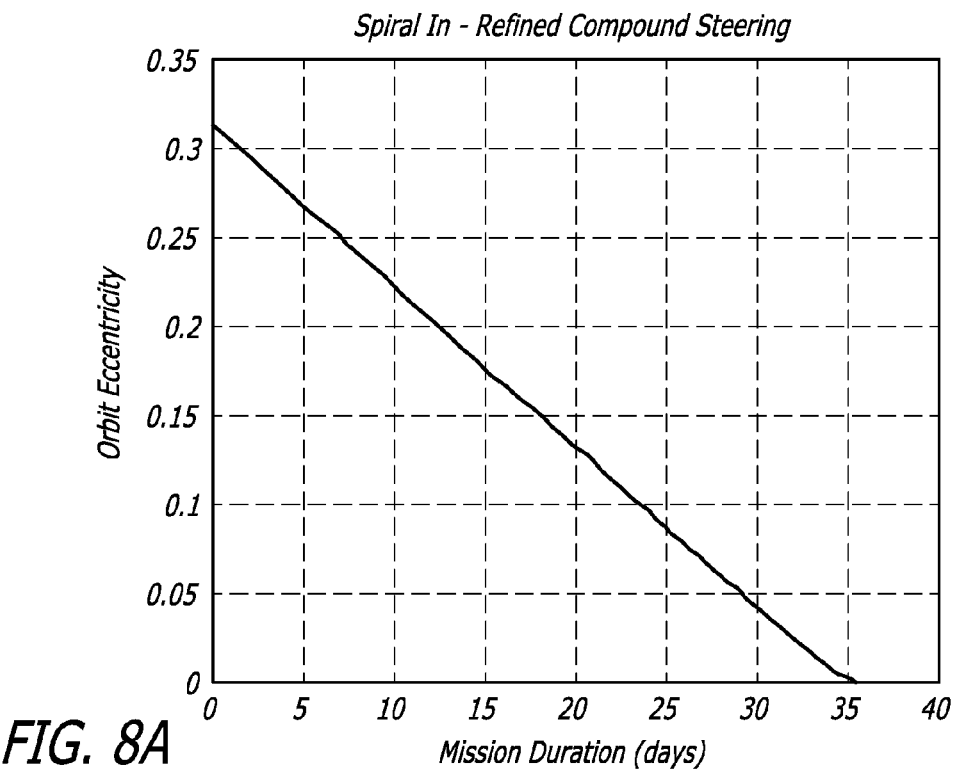
FIG. 8A shows the orbit eccentricity profile as a function of transfer orbit duration using the disclosed refined compound steering law for a super-synchronous eccentric initial orbit (i.e. spiral in), in accordance with at least one embodiment of the present disclosure.
Figure 8B:
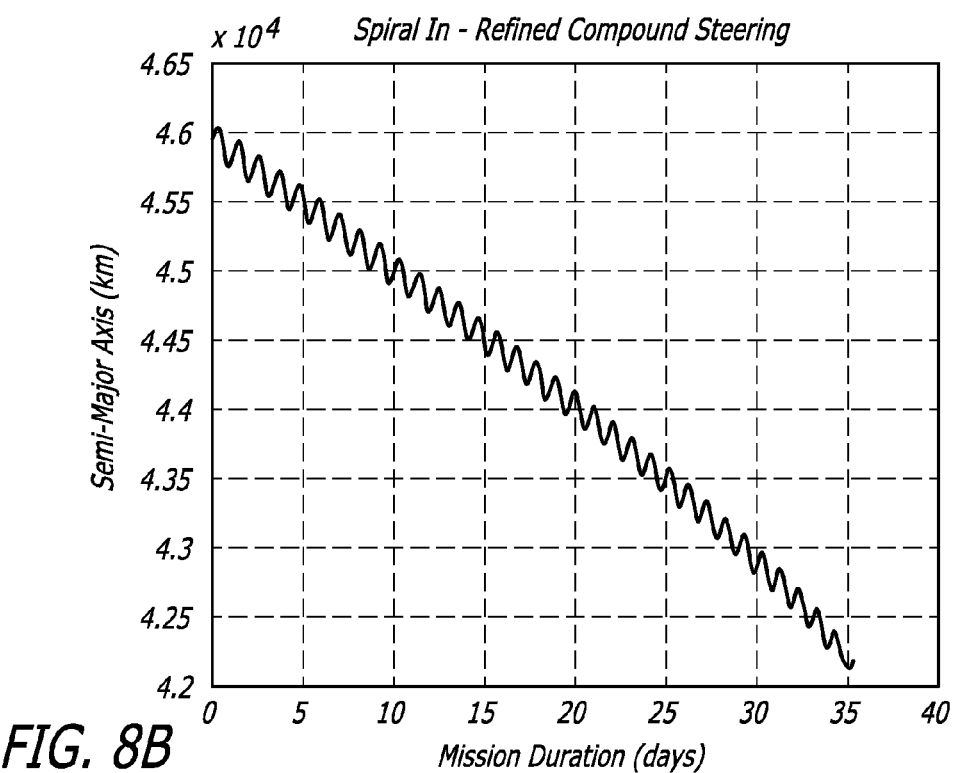
FIG. 8B shows the semi-major axis profile as a function of transfer orbit duration using the disclosed refined compound steering law for a super-synchronous eccentric initial orbit (i.e. spiral in), in accordance with at least one embodiment of the present disclosure.
Figure 8C:
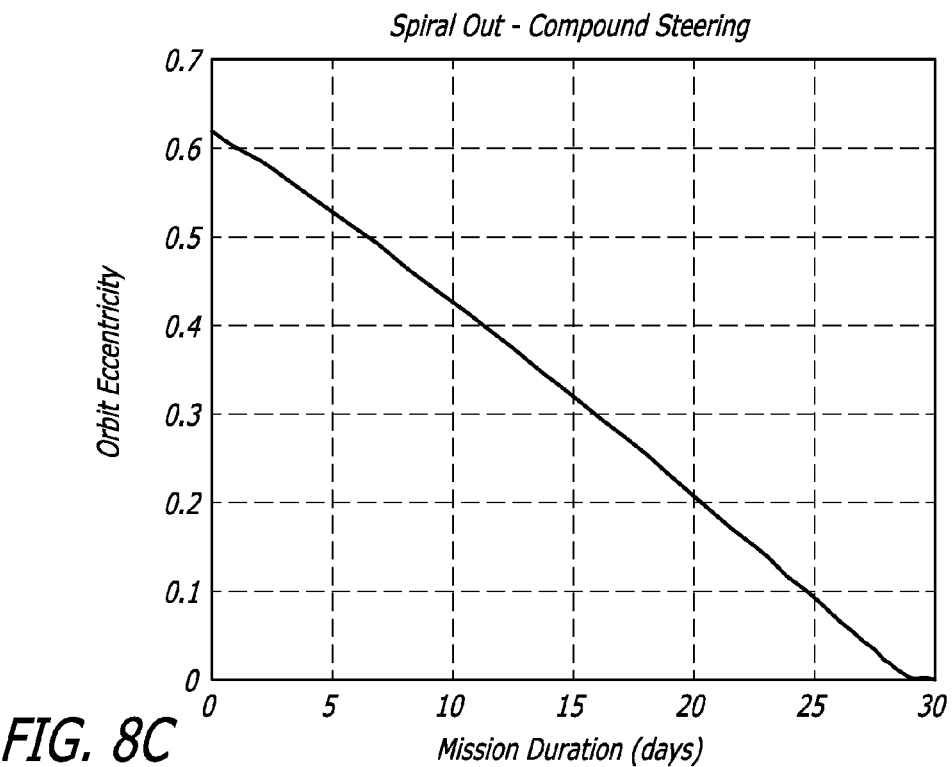
FIG. 8C shows the orbit eccentricity profile as a function of transfer orbit duration using the disclosed compound steering law for a sub-synchronous eccentric initial orbit (i.e. spiral out), in accordance with at least one embodiment of the present disclosure.
Figure 8D:
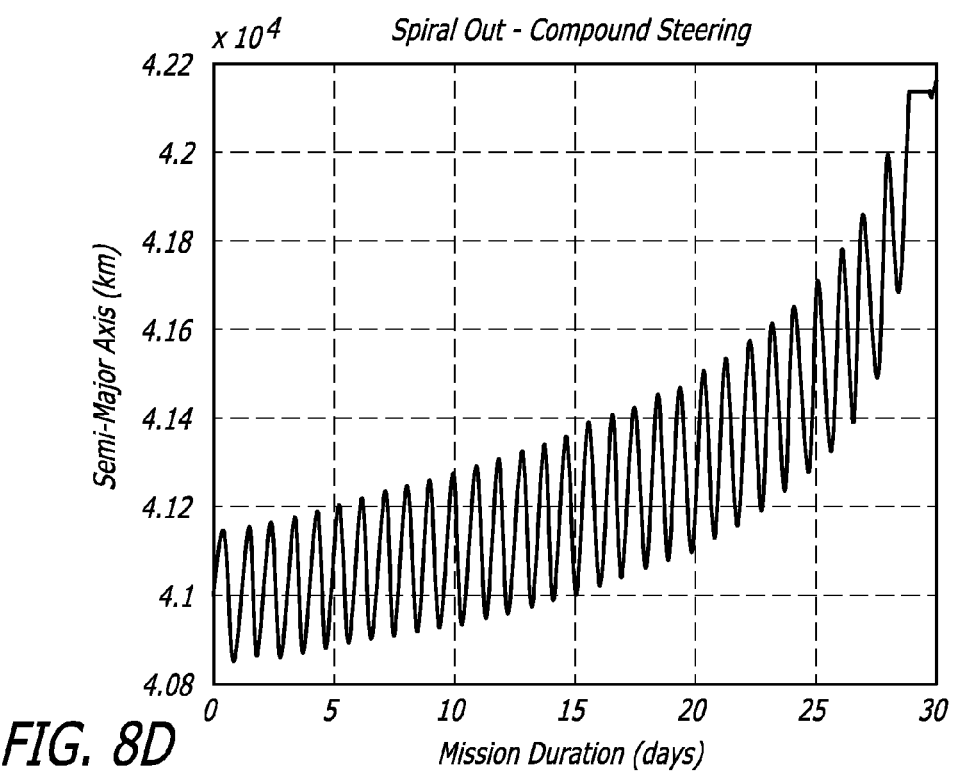
FIG. 8D shows the semi-major axis profile as a function of transfer orbit duration using the disclosed compound steering law for a sub-synchronous eccentric initial orbit (i.e. spiral out), in accordance with at least one embodiment of the present disclosure.

FIGS. 8A, 8B, 8C, and 8D show simulated orbit eccentricity and semi-major axis profiles as a function of transfer orbit duration (TOD) when using the compound steering law for super-synchronous and sub-synchronous eccentric initial orbit cases. In particular, FIG. 8A shows the orbit eccentricity profile as a function of transfer orbit duration using the disclosed refined compound steering law for a super-synchronous eccentric initial orbit (i.e. spiral in), FIG. 8B shows the semi-major axis profile as a function of transfer orbit duration using the disclosed refined compound steering law for a super-synchronous eccentric initial orbit (i.e. spiral in), FIG. 8C shows the orbit eccentricity profile as a function of transfer orbit duration using the disclosed compound steering law for a sub-synchronous eccentric initial orbit (i.e. spiral out), and FIG. 8D shows the semi-major axis profile as a function of transfer orbit duration using the disclosed compound steering law for a sub-synchronous eccentric initial orbit (i.e. spiral out). The compound steering law simulation results shown in these figures demonstrate that a simultaneous and continuous change to both the orbit semi-major axis and eccentricity parameters are achieved throughout the transfer orbit mission.

Enhanced Compound Steering Law

As previously mentioned, the compound steering law, which was discussed in detail above, utilizes two parameters (i.e. the orbit eccentricity and the semi-major axis) to compute the thrust vector direction for the spacecraft, while the enhanced compound steering law adds an additional third parameter of orbit inclination to compute the thrust vector direction for the spacecraft.

The enhanced compound steering law of the present disclosure provides a general low thrust transfer mission steering law, which is operationally easy to implement and execute, and is more efficient than the conventional steering laws for most transfers between orbits. The enhanced compound steering law computes a thrust vector direction to change the orbit eccentricity, the semi-major axis, and the orbit inclination of a spacecraft simultaneously and efficiently, without the use of a computationally expensive optimization algorithm. The disclosed enhanced compound steering law reduces transfer duration between orbits for space missions with continuous, or near continuous, firing (or activating) of a low thrust propulsion system.

Current, existing solutions employ multiple steering laws, in distinct phases, during the course of a transfer orbit mission in order to achieve the multiple orbital target parameters (e.g., the eccentricity, the semi-major axis, and the inclination). One of the major disadvantages of these existing solutions is that they require switching between steering strategies, which involves reconfiguration of the control systems and, in turn, requires large changes in the spacecraft orientation. Further, frequent switching poses operational complexities, including a significant amount of down (or no-burn) time, which renders the existing solutions cumbersome.

In particular, these existing solutions for low thrust transfer strategies (also referred to as baseline solutions in this document) involve dividing the transfer into two phases. The first phase involves orbit raising to target the semi-major axis. For this phase, the thrust direction is perpendicular to the radial (i.e. nadir) direction, while the out-of-plane angle is optimized to remove the majority of the inclination. The second phase involves orbit circularization, or eccentricity reduction. In this phase, the in-plane thrust direction is fixed in the inertial direction, while the out-of-plane angle is optimized to remove the remainder of inclination.

The present disclosure teaches a new and enhanced compound steering law that combines the individual effects of the existing steering strategies. The enhanced compound steering law makes it possible to more efficiently accomplish two or three orbital objectives (i.e. namely the orbital eccentricity, the semi-major axis, and the inclination) simultaneously, while allowing for continuous, or near continuous, firing of the thrusters (or activating of at least one propulsion device) and a smooth transition of the spacecraft orientation. In most cases, this steering law allows for a shorter mission duration. It also offers mission design flexibility (e.g., it allows for more error tolerance, and the mission duration can be traded with the station keeping life). This steering law offers a faster transfer orbit mission profile computation, without compromising efficiency. The enhanced compound steering law is easy to implement on-board a space vehicle, as it requires minimum processing. A small number of parameters can be uploaded for each transfer orbit revolution, or per maneuver segment, in lieu of a time history of the thrust vector.

As previously mentioned, enhanced compound steering law offers a shorter mission duration as compared to existing solutions. It also offers more a flexible mission design, i.e. it allows for achieving non-time sensitive orbital targets (e.g., the semi-major axis, the eccentricity, and the inclination) either simultaneously, or at different times, using strategy based weighting factors. Further, it offers a significantly higher capability of absorbing changes and constraints in the mission design, system performance errors, and operation contingency. The disclosed enhanced compound steering law offers a better control algorithm by offering an unprecedented flexibility of in-orbit targeting with easier optimization, thereby reducing the computational effort. In addition, the self-correcting nature of this algorithm to reach the non-time sensitive targets allows for a simple feed forward implementation for autonomous on-board control.

Lastly, the enhanced compound steering law is more adaptive to any type of mission or launch vehicle performance. For example, an augmentation of chemical transfer could bypass the limitation of most launch vehicles (i.e., a poor two-burn strategy can only raise the injection orbit apogee and/or reduce the inclination, but heavy penalizes for raising the injection orbit perigee), and make the best use of the enhanced compound steering by setting up the pre-electrical power system (EPS)/post-chemical transfer phase orbit (i.e. the less eccentric sweet spot) where the performance of this steering law is most optimal to allow for an increase in capacity for a heavier payload.

FIG. 9 shows formulas defining the disclosed enhanced compound steering law for general low thrust missions for a spacecraft, in accordance with at least one embodiment of the present disclosure. For these formulas, f is a function of the proportion of the change between the eccentricity and the semi-major axis, which both correspond to the desired orbit for the spacecraft. In particular, f is a function of $\Delta t_{sma}$ and $\Delta t_{eccentricity}$, where $\Delta t_{sma}$ is the amount of time allocated to perform thrusting (or to perform activating of at least one propulsion device) to achieve the semi-major axis (sma) that corresponds to the desired orbit for the spacecraft, and $\Delta t_{eccentricity}$ is the amount of time allocated to perform thrusting (or to perform activating of at least one propulsion device) to achieve the orbit eccentricity (ecc) that corresponds to the desired orbit for the spacecraft. f is also a function of $\alpha$, where $\alpha$ is the semi-major axis and eccentricity correction ratio. $\alpha$ is a function of $\Delta t_{sma}$ and $\Delta t_{eccentricity}$.

$\vec{F}_{in\text{-}plane}$ is a unit vector in a direction of the in-plane thrust direction. $\vec{F}_{in\text{-}plane}$ is a function of f, $\hat{u}_{eccentricity}$, and $\hat{u}_{sma}$, where $\hat{u}_{eccentricity}$ is a unit vector in a direction of the thrust direction required to change the eccentricity to the eccentricity that corresponds to the desired orbit for the spacecraft, and $\hat{u}_{sma}$ is a unit vector in a direction of the thrust direction required to change the semi-major axis to the semi-major axis that corresponds to the desired orbit for the spacecraft.

As is shown in FIG. 9, $\hat{u}_{eccentricity}$ is equal to the change in velocity required to achieve the target orbit eccentricity ($\Delta \vec{V}_{eccentricity}$) divided by the absolute value of the change in velocity required to achieve the target orbit eccentricity ($\Delta \vec{V}_{eccentricity}$). Also, $\hat{u}_{sma}$ is equal to the change in velocity required to achieve the target semi-major axis ($\Delta \vec{V}_{sma}$) divided by the absolute value of the change in velocity required to achieve the target semi-major axis ($\Delta \vec{V}_{sma}$).

$\vec{F}$ is a vector in the thrust direction that will change the current orbit of the spacecraft to the desired orbit for the spacecraft, thereby changing the orbit eccentricity, the semi-major axis, and the orbit inclination simultaneously to achieve the specific orbit eccentricity, the semi-major axis, and the orbit inclination that correspond to the desired orbit for the spacecraft. In particular, $\vec{F}$ comprises components $u_v$, $u_u$, and $\cos(\beta)$; where $u_v$ is a vector in a direction along the in-track direction of the orbit, $u_u$ is equal to the cross product of $u_w \times u_v$ (where $u_w$ is a vector in a direction along the cross track direction of the orbit), $\cos(\beta)$ is the cosine of angle $\beta$, and $\beta$ is the out-of-plane angle of the thrust direction. In particular, $\beta$ is the arctangent of $\Delta t_{inclination}$ divided by $\Delta t_{in\text{-}plane}$, where $\Delta t_{inclination}$ is the amount of time allocated to perform thrusting (or to perform activating of at least one propulsion device) to achieve the orbit inclination that corresponds to the desired orbit for the spacecraft, and $\Delta t_{in\text{-}plane}$ is computed from the absolute value of the sum of $\Delta \vec{V}_{eccentricity}$ and $\Delta \vec{V}_{sma}$.

FIG. 10 shows formulas for the in-plane component of enhanced compound steering with weighting factors, in accordance with at least one embodiment of the present disclosure. Strategy based weighting factors are introduced to the enhanced compound steering formulation to allow for a more efficient orbit transfer over a wide range of conditions. For these formulas, $\alpha_0$ is used to control the magnitude of $\alpha$, which is the semi-major axis and eccentricity correction ratio. In particular, $\alpha_0$ is a function of $\Delta t_{sma}$, $\Delta t_{eccentricity}$, and $\omega_{sma}$, where $\omega_{sma}$ is a weighting factor on $\alpha_0$ to control the magnitude of $\alpha$. For these formulas, $\alpha$ is shown to be a function of $\alpha_0$, $\omega_{ecc}$, $\lambda$, and $\lambda_{ecc}$, where $\omega_{ecc}$ is a weighting factor to control the amount of location dependency of $\alpha$, $\lambda$ is the orbital location (right ascension), and $\lambda_{ecc}$ is the location to change the eccentricity vector.

For these formulas, $\vec{F}_{in\text{-}plane}$ is a unit vector in a direction of the in-plane thrust direction that will change the current orbit of the spacecraft to the desired orbit for the spacecraft, thereby changing the orbit eccentricity and the semi-major axis simultaneously to achieve the specific orbit eccentricity and the semi-major axis that correspond to the desired orbit for the spacecraft. In particular, $\vec{F}_{in\text{-}plane}$ comprises components $u_v$, $u_u$, and zero (0). As such, for $\vec{F}_{in\text{-}plane}$, the inclination component is equal to zero.

FIG. 11 shows formulas for the out-of-plane component of enhanced compound steering with weighting factors, in accordance with at least one embodiment of the present disclosure. Strategy based weighting factors are employed for these formulas. For these formulas, $\beta_0$ is used to control the magnitude of $\beta$, which is the out-of-plane angle of the thrust direction. In particular, $\beta_0$ is a function of $\Delta t_{inclination}$, $\Delta t_{in\text{-}plane}$, and $\omega_\beta$, where $\omega_\beta$ is a weighting factor on $\beta$ to control the out-of-plane angle (i.e. $\beta$). For these formulas, $\beta$ is a function of $\beta_0$, $A_{target}$, $\lambda$, $\lambda_{inc}$, R, and $\omega_{inc}$; where $A_{target}$ is the target semi-major axis, $\lambda$ is the orbital location (right ascension), $\lambda_{inc}$ is the optimal location to change the inclination vector, R is the distance from the spacecraft to the center of the Earth, and $\omega_{inc}$ is a weighting factor to control the amount of location dependency of $\beta$.

FIG. 12 shows a formula for the resulting direction for the enhanced compound steering, in accordance with at least one embodiment of the present disclosure. For this formula, $\vec{F}$ is a vector in the thrust direction that will change the current orbit of the spacecraft to the desired orbit for the spacecraft, thereby changing the orbit eccentricity, the semi-major axis, and the orbit inclination simultaneously to achieve the specific orbit eccentricity, the semi-major axis, and the orbit inclination that correspond to the desired orbit for the spacecraft. As mentioned above, $\vec{F}$ comprises components $u_v$, $u_u$, and $\cos(\beta)$.

Figure 13:
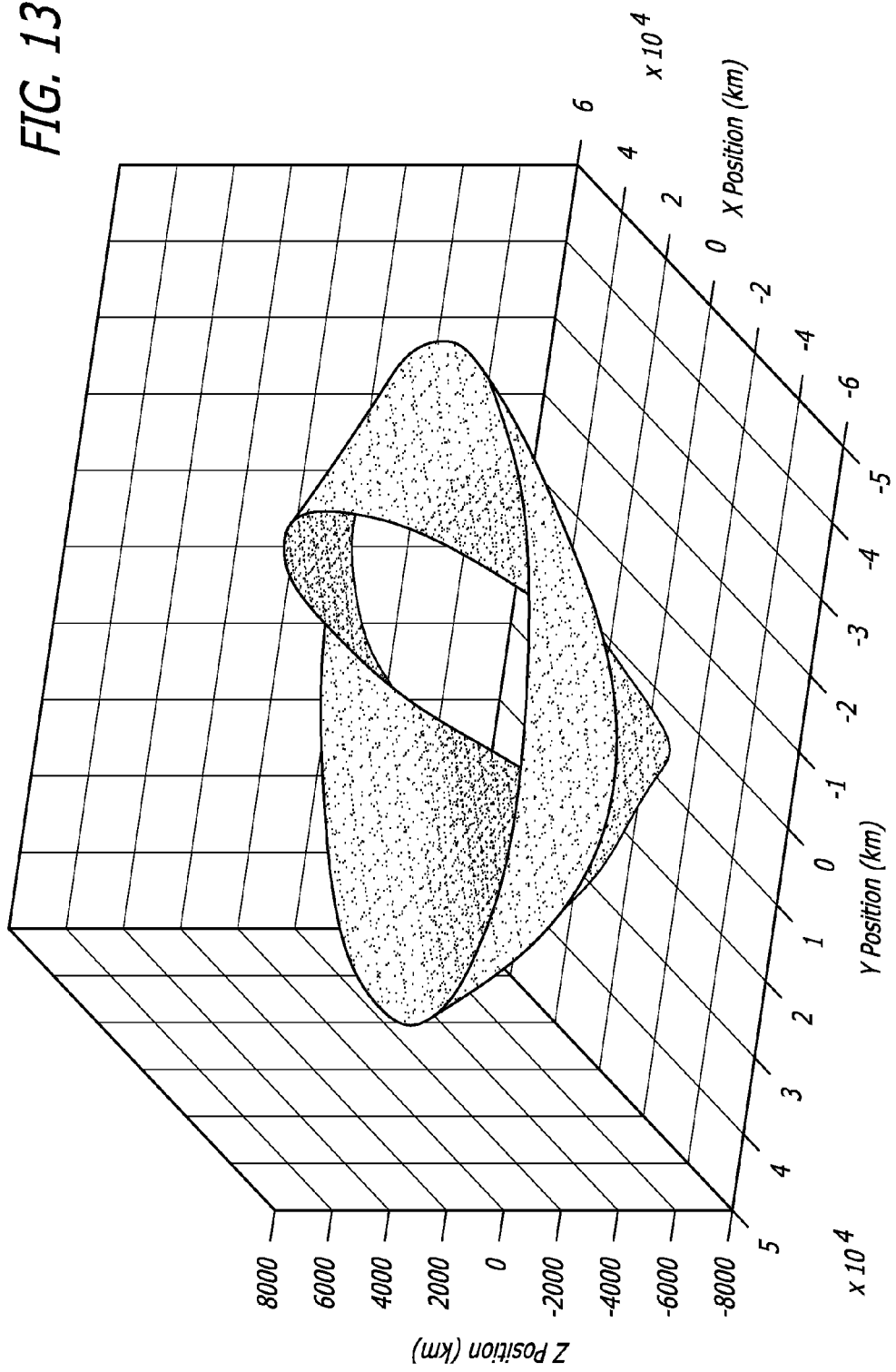
FIG. 13 is a three-dimensional (3D) graph depicting the spacecraft trajectory when using the disclosed enhanced compound steering strategy, in accordance with at least one embodiment of the present disclosure.

FIG. 13 is a three-dimensional (3D) graph depicting the spacecraft trajectory when using the disclosed enhanced compound steering strategy, in accordance with at least one embodiment of the present disclosure. In particular, the 3D graph illustrates the thrust trajectory when using the enhanced compound steering law to transition a spacecraft from an initial sub-synchronous eccentric inclined orbit to a geostationary equatorial circular target orbit.

FIGS. 14A and 14B contain a table showing a comparison of the transfer orbit duration (TOD) (using a Keplerian orbit model) of baseline cases utilizing existing steering strategies and the TOD of cases employing the disclosed enhanced compound steering strategy, in accordance with at least one embodiment of the present disclosure. In particular, this table shows the spacecraft separation mass and orbit for the various different cases that were analyzed. For these cases, the target orbit, or the final orbit, is a circular geostationary equatorial orbit.

Two of the columns of the table compare the amount of time the thrusters were required to be turned on in days (i.e. the Thruster Ontime columns) using a baseline strategy (i.e. an existing strategy) and the amount of time the thrusters were required to be turned on in days (i.e. the Thruster Ontime columns) using the enhanced compound steering strategy. The last column of the table lists a percentage difference between the thruster on times for the two strategies (i.e. the baseline strategy and the enhanced compound steering law strategy). The results listed in the table show that all of the cases that used the enhanced compound steering strategy had lower thruster on times than the cases that used the baseline strategy cases. The thruster on times for the cases that used the enhanced compound steering law strategy were observed to be up to 15% lower than the thruster on times for the cases that used the baseline strategy.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. A method for application of a compound steering law for general low thrust mission for a spacecraft, the method comprising:
   calculating, with at least one processor, a desired orbit for the spacecraft;
   calculating, with the at least one processor, a velocity change required to achieve an orbit eccentricity that corresponds to the desired orbit for the spacecraft;
   calculating, with the at least one processor, a velocity change required to achieve a semi-major axis that corresponds to the desired orbit for the spacecraft;
   calculating, with the at least one processor, a velocity change required to achieve an orbit inclination that corresponds to the desired orbit for the spacecraft;
   calculating, with the at least one processor, a direction of a vector sum of the velocity change required to achieve the orbit eccentricity, the velocity change required to achieve the semi-major axis, and the velocity change required to achieve the orbit inclination; and
   activating at least one propulsion device of the spacecraft in the direction of the vector sum in order to change a current orbit of the spacecraft to the desired orbit for the spacecraft, thereby changing the orbit eccentricity, the semi-major axis, and the orbit inclination simultaneously.

2. The method of claim 1, wherein the spacecraft is one of a satellite, a pseudo satellite, a rocket, a launch vehicle, and a space plane.

3. The method of claim 1, wherein the at least one propulsion device is at least one of a chemical propulsion system and an electrical propulsion system (EPS), wherein the chemical propulsion system comprises at least one of a liquid propulsion system (LPS), a solid propulsion system, and a gaseous propulsion system.

4. The method of claim 3, wherein the EPS is a xenon-ion propulsion system (XIPS).

5. The method of claim 3, wherein the LPS employs at least one of a monopropellant and a bipropellant.

6. The method of claim 1, wherein the method is performed during a transfer orbit mission for the spacecraft.

7. The method of claim 1, wherein a transition orbit mission changes from at least one of a lower Earth orbit (LEO), a medium Earth orbit (MEO), geosynchronous Earth orbit (GEO), a highly elliptical orbit (HEO), an inter-planetary orbit, and a lunar orbit mission to at least one of a target LEO, MEO, GEO, HEO, inter-planetary orbit, and lunar orbit for the spacecraft.

8. The method of claim 1, wherein a transition orbit mission changes an initial geo-synchronous eccentric orbit of the spacecraft to a target orbit for the spacecraft.

9. The method of claim 1, wherein a transition orbit mission changes an initial sub-synchronous eccentric orbit of the spacecraft to a target orbit for the spacecraft.

10. The method of claim 1, wherein a transition orbit mission changes an initial super-synchronous eccentric orbit of the spacecraft to a target orbit for the spacecraft.

11. The method of claim 1, wherein the method is performed during an on-station mission for the spacecraft.

12. The method of claim 1, wherein the method is performed with a fixed transfer orbit duration (TOD) in order to maximize payload capacity.

13. The method of claim 1, wherein the method is performed with a variable TOD in order to minimize the TOD for a fixed payload capacity.

14. A method for application of a compound steering law for general low thrust mission for a spacecraft, the method comprising:
  calculating, with at least one processor, a desired orbit for the spacecraft;
  calculating, with the at least one processor, a velocity change required to achieve an orbit eccentricity that corresponds to the desired orbit for the spacecraft;
calculating, with the at least one processor, a velocity change required to achieve a semi-major axis that corresponds to the desired orbit for the spacecraft;
calculating, with the at least one processor, a velocity change required to achieve an orbit inclination that corresponds to the desired orbit for the spacecraft;
  calculating, with the at least one processor, a direction of a vector sum of the velocity change required to achieve the orbit eccentricity, the velocity change required to achieve the semi-major axis, and the velocity change required to achieve the orbit inclination,
  wherein the at least one processor uses at least one weighting factor for the calculating of the direction of the vector sum;
  activating at least one propulsion device of the spacecraft in the direction of the vector sum in order to change a current orbit of the spacecraft to the desired orbit for the spacecraft, thereby changing the orbit eccentricity, the semi-major axis, and the orbit inclination simultaneously.

15. The method of claim 14, wherein the at least one propulsion device is at least one of a chemical propulsion system and an electrical propulsion system (EPS), wherein the chemical propulsion system comprises at least one of a liquid propulsion system (LPS), a solid propulsion system, and a gaseous propulsion system.

16. The method of claim 15, wherein the EPS is a XIPS.

17. The method of claim 15, wherein the LPS employs at least one of a monopropellant and a bipropellant.

18. The method of claim 14, wherein the method is performed during a transfer orbit mission for the spacecraft.

19. The method of claim 14, wherein the method is performed during an on-station mission for the spacecraft.

20. A system for application of a compound steering law for general low thrust mission for a spacecraft, the system comprising:
  at least one processor configured for calculating a desired orbit for the spacecraft,
  wherein the at least one processor is further configured for calculating a velocity change required to achieve an orbit eccentricity that corresponds to the desired orbit for the spacecraft, a velocity change required to achieve a semi-major axis that corresponds to the desired orbit for the spacecraft, and a velocity change required to achieve an orbit inclination that corresponds to the desired orbit for the spacecraft;
  wherein the at least one processor is further configured for calculating a direction of a vector sum of the velocity change required to achieve the orbit eccentricity, the velocity change required to achieve the semi-major axis, and the velocity change required to achieve the orbit inclination; and
  at least one propulsion device on the spacecraft configured for activating in the direction of the vector sum in order to change a current orbit of the spacecraft to the desired orbit for the spacecraft, thereby changing the orbit eccentricity, the semi-major axis, and the orbit inclination simultaneously.

* * * * *